G. J. LEROUX.
MOLD CONVEYER FOR FOUNDRIES.
APPLICATION FILED AUG. 8, 1910.

1,005,986.

Patented Oct. 17, 1911.

2 SHEETS—SHEET 1.

WITNESSES:
D. C. Watter
Leona Kiburtz

INVENTOR.
George J. Leroux,

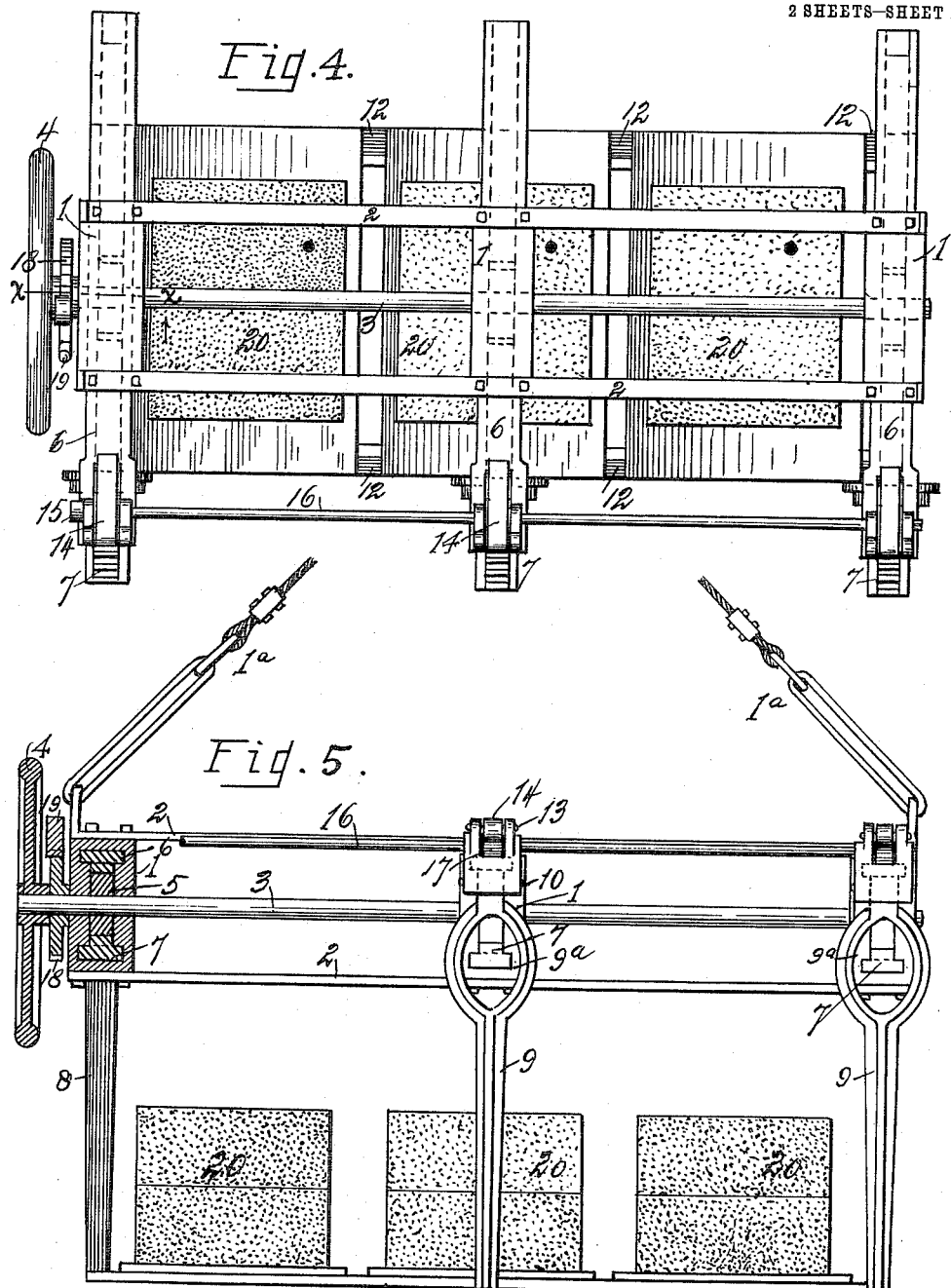

UNITED STATES PATENT OFFICE.

GEORGE J. LEROUX, OF TOLEDO, OHIO.

MOLD-CONVEYER FOR FOUNDRIES.

1,005,986.

Specification of Letters Patent. Patented Oct. 17, 1911.

Application filed August 8, 1910. Serial No. 576,140.

*To all whom it may concern:*

Be it known that I, GEORGE J. LEROUX, a citizen of the United States, residing at Toledo, in the county of Lucas and State of Ohio, have invented a certain new and useful Mold-Conveyer for Foundries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In foundries much time and heavy labor are consumed in handling flasks and molds, and, more especially, in conveying the molds to the sand heaps and in dumping the molds to recover the castings. When the metal is poured the molds are usually arranged in rows, at suitable intervals, and after the castings are made it is important to have the sand dumped and the castings recovered as rapidly as possible. This work is extremely laborious since it is usually performed manually.

My invention relates to and its object is to provide means for overcoming the difficulties and objections here indicated, and, more particularly, to furnish a device by which a number of flasks or molds may be simultaneously and rapidly lifted, conveyed and dumped with but slight exertion on the part of the operator. I attain these objects by means of the devices and mechanism hereinafter described, and shown and illustrated in the accompanying drawings, in which,—

Figure 1:
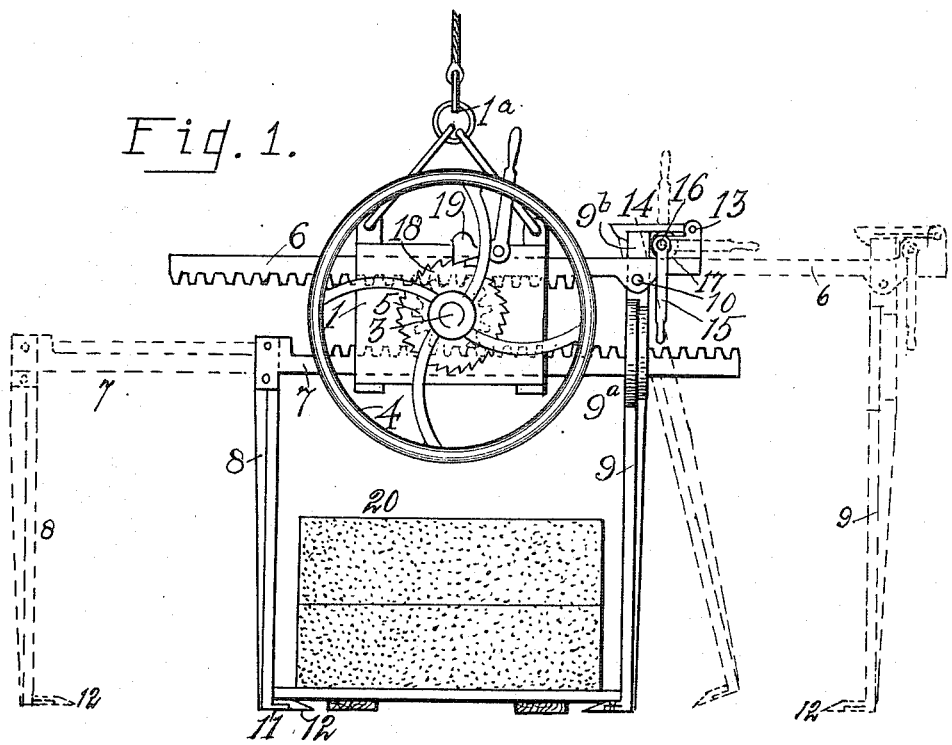
Figure 2:
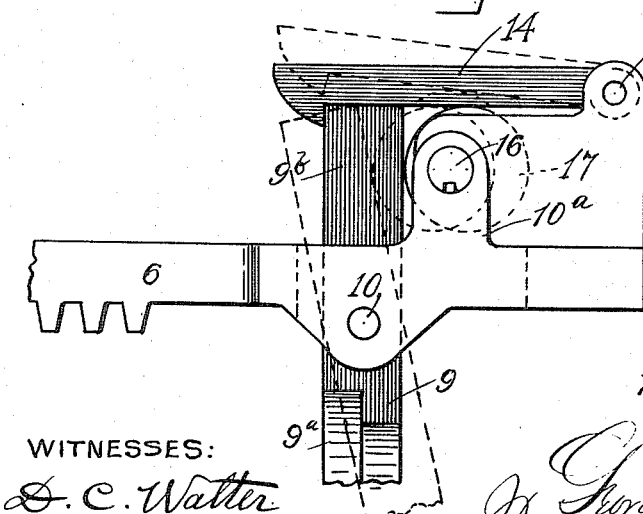
Figure 3:
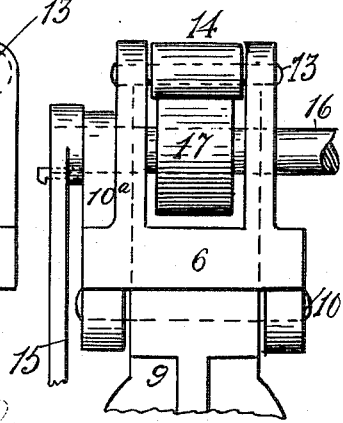

Figure 1 is an end-elevation of my device; Fig. 2, an enlarged side-elevation—in detail— of the device for unlocking and actuating the pivoted grappling arm, hereinafter referred to; Fig. 3, an end-elevation of the same; Fig. 4, a top-plan view of my device, and Fig. 5, a side-elevation of the same, partly in section.

Like parts are represented by corresponding numerals throughout the drawings.

In the drawings, 1—1 are heads or housings, in the present instance—for illustration—three in number, rigidly united in horizontal alinement and at suitable intervals by connecting bars 2. In the several heads is journaled—centrally—a shaft 3 having fixed upon its forwardly projecting end a hand-wheel 4. Fixed upon the shaft 3 within each of the heads or housings is a pinion 5 which engages at top a rack-bar 6 and at bottom a rack-bar 7, the two sets of rack-bars being arranged to slide horizontally to and fro in the heads or housings in opposite directions when actuated by the rotation of the pinions. Each of the rack-bars carries at its outer end a downwardly extended arm, the arms 8 of the bars 7 being rigidly secured at their upper ends to their rack-bars. The arms 9 are pivotally supported near their upper ends, as at 10, upon the rack-bars 6. The downwardly extending arms 8—9— at opposite sides of the device—have secured to their lower ends, as at 11, metal strips 12—sharp at their inner edges—to form transversely elongated hooks or grappling-members adapted to slip beneath the opposite margins of the boards or bases upon which rest the molds to be handled. The arms 9 have therethrough openings $9^a$ through which the ends of rack-bars 7 may reciprocate.

The arms 9 project above the rack-bars 6, as at $9^b$. Upon the top of the ends of the bars 6 are pivoted, as at 13, dogs 14 arranged to fall into engagement with the upwardly projecting extremities of the arms 9 to prevent the arms from swinging on their pivots 10.

15 is a hand-lever fulcrumed, on top of the bar 6.

16 is a shaft journaled in lugs $10^a$ on top of rack-bars 6. The shaft 16 to which the lever is secured and which forms its fulcrum, carries a series of cams 17 disposed in the meeting angles of the upper ends of the arms 9 and the dogs 14. When the handle 15 is thrown upwardly, as indicated by the dotted lines in Fig. 1, the eccentric surfaces of the cams contacting with the arms 9 and dogs 14 first throw the dogs out of engagement with the arms 9 and then swing the arms 9 on their pivots into the inclined position indicated by the dotted lines in Fig. 1.

Each of the heads 1 is provided with a sling $1^a$ adapted for connection with a suitable crane or other hoisting and conveying apparatus by which a load may be lifted and conveyed from the foundry floor to the sand heap or elsewhere. As this hoisting and conveying device may be of any suitable design and construction and as it forms no part of this invention, it need not be here further described. Upon the shaft 1 is fixed a ratchet-wheel 18 arranged for engagement by a pawl 19 pivoted upon the head 1 to prevent rotation of the shaft.

The operation of my device is as follows: It being desired to handle a row of molds (20), the arms 8 and 9 are thrown into widely separated positions, as indicated by the dotted lines in Fig. 1. The device is now, by means of the sling, placed directly over the row of molds with the bars 8—9 at opposite sides of the row. The dogs 14 are thrown into engagement with the upper ends of the bars 9 and the hand-wheel is rotated to move the two sets of rack-bars toward each other and to bring the points of the pieces 12 firmly beneath the opposite margins of the base or boards supporting the several molds. The pawl 19 being engaged with the ratchet 18, the rack-bars, the arms 8—9 and the grappling pieces 12 are held against movement. Now the sling is hoisted away and the device with its load is conveyed to the desired point. The lever 15 being thrown into upright position to release the dogs 14 and to swing the arms 9 out of engagement with their load, by means of the throw of the several cams, as above described, it is now only necessary to hoist the device when the hook 12 at the lower end of the arms 8 will turn the several molds upside down, thus simultaneously dumping the series of molds. If it is desired to release the several molds without dumping them, the pawl is released from its ratchet, and the rotation of the hand-wheel will move the hooks 12 out of engagement with the supports for the molds.

It will be understood that while in the drawings my device is shown as constructed for three separate molds, the device may be made as long and as heavy as may be desired so that it may handle any desired number of molds at the same time.

Having described my invention, what I claim and desire to secure by Letters Patent is,—

1. In a device of the described character, a housing, a shaft journaled therein, a pinion on the shaft, a pair of rack-bars engaged with opposite sides of the pinion, downwardly projecting arms carried by the rack-bars and having at their lower extremities inwardly turned hook-members, means for suspending the housing, means for locking the shaft against rotation, and means for releasing one of the hook-members from its load in advance of the other.

2. In a device of the described character, a housing, a shaft journaled therein, a pinion on the shaft, a pair of rack-bars engaged with opposite sides of the pinion, downwardly projecting arms carried by the rack-bars and having at their lower extremities inwardly turned hook-members, means for turning the shaft, means for suspending the housing, means for locking the shaft against rotation, and means for locking and swinging one of said arms independently of the other.

3. In a device of the described character, a series of housings disposed and secured in alinement, a shaft journaled in said housings, in each housing a pinion and a pair of horizontal rack-bars engaged with opposite sides of said pinions, downwardly projecting arms carried by said rack-bars, said arms having at their lower extremities inwardly turned hook-members, and means for rotating the shaft.

4. In a device of the described character, a series of housings disposed and secured in alinement, a shaft journaled in said housings, in each housing a pinion and a pair of horizontal rack-bars engaged with opposite sides of said pinions, downwardly projecting arms carried by said rack-bars, said arms having at their lower extremities inwardly turned hook-members, means for rotating the shaft, and means for locking the shaft against rotation.

5. In a device of the described character, a series of housings disposed and secured in alinement, a shaft journaled in said housings, in each housing a pinion and a pair of horizontal rack-bars engaged with opposite sides of said pinions, downwardly projecting arms carried by said rack-bars, said arms having hook-members at their lower extremities, means for rotating the shaft, means for locking the shaft against rotation, combined with means for actuating and for locking the arms of one set of rack-bars independently of the other set of rack-bars.

In testimony whereof I affix my signature in presence of two witnesses.

GEORGE J. LEROUX.

Witnesses:
CLAYTON MURPHY,
LEONA KIBURTZ.